United States Patent [19]

Dohanich, Jr. et al.

[11] 3,931,555

[45] Jan. 6, 1976

[54] ACCELERATION CONTROL SYSTEM FOR A D-C MOTOR

[75] Inventors: George J. Dohanich, Jr.; John C. Rohde, both of Endicott; Gary A. Trudgen, Endwell, all of N.Y.

[73] Assignee: International Business Machines Corporation, Armonk, N.Y.

[22] Filed: May 20, 1974

[21] Appl. No.: 471,624

Related U.S. Application Data

[63] Continuation-in-part of Ser. No. 317,017, Dec. 20, 1972, abandoned.

[52] U.S. Cl. .................... 318/314; 318/142; 318/7
[51] Int. Cl.² ........................................ H02P 5/16
[58] Field of Search .................... 318/314, 7, 142

[56] References Cited
UNITED STATES PATENTS

| | | | |
|---|---|---|---|
| 2,692,361 | 10/1954 | Asbury et al. | 318/142 |
| 2,913,652 | 11/1959 | Greenburg et al. | 318/314 X |

*Primary Examiner*—B. Dobeck
*Attorney, Agent, or Firm*—John S. Gasper

[57] ABSTRACT

A digital pulse source generates a frequency analog of a desired velocity to which a d-c motor is accelerated. The acceleration circuit comprises a circuit means for converting a frequency analog signal to a frequency dependent direct voltage and a sawtooth voltage. A comparison circuit generates a motor drive signal having a duty cycle dependent on the relative voltage levels of the direct and sawtooth voltages. The comparative duty cycle of motor drive signal for two different velocities is regulated to be proportional to the square of the ratio of the two velocities.

9 Claims, 11 Drawing Figures

CASE 1
f = f MAX

CASE 2
f = $\frac{f\,MAX}{2}$

CASE 3
f = $\frac{f\,MAX}{3}$

ACCELERATION CONTROL SYSTEM FOR A D-C MOTOR

This is a continuation-in-part application of a pending application, Ser. No. 317,017, filed Dec. 20, 1972, of George J. Dohanich, Jr., John C. Rohde and Gary A. Trudgen for "Acceleration Control System for a D-C Motor" and now abandoned.

BACKGROUND OF THE INVENTION

1. Field of the Invention

This invention relates to a motor control system and particularly to a system for controlling the acceleration of a d-c motor through a fixed angle of rotation.

While not necessarily limited thereto this invention has particular application to a control system for motors which drive a print element of the type used for endorsing moving unit record documents.

2. Description of the Prior Art

In document handling machines, unit record documents such as checks or the like are endorsed by a rotatable type element driven by a motor. The type element is usually in the form of a type segment which is rotated by the motor through a fixed angle usually from a predetermined initial position at rest to a predetermined velocity which approximates the speed of travel of the document to be endorsed. For good legibility, as well as precise location of the endorsement onto the check, the acceleration of the drive motor should be very precisely controlled. Various systems for controlling the acceleration of the motor have been provided such as shown on pages 1918 – 1919 of the IBM Technical Disclosure Bulletin, Vol. 14, No. 6, dated November 1971. Prior systems while being capable of accurate acceleration of the d-c motor have certain limitations under some operating conditions. For example, should the velocity of the document to be endorsed be substantially changed such as when the document handling machine is in the process of starting up or shutting down, then the location of the endorsement and its legibility could be seriously disturbed unless the motor is capable of being controlled to meet the changing velocity conditions.

SUMMARY OF THE INVENTION

It is a general object of this invention to provide an improved d-c motor control system.

It is a specific object of this invention to provide an improved d-c motor control system capable of accelerating a motor to plural velocities very precisely through a predetermined angle of rotation.

The above, as well as other objects, are obtained in accordance with this invention by providing a d-c motor control system which utilizes a source of digital pulses for generating a frequency analog signal representing the desired velocity of the motor. The frequency analog signal is then converted to two voltage analog control signals, one of which is a direct voltage whose voltage level is proportional to the desired velocity, and the second of which is a frequency analog control signal whose frequency rate is proportional to the desired velocity. Motor drive control signals are generated on the basis of a comparison of the voltage level of the first and second voltage analog control signals. The acceleration of the d-c motor using the driver control signals is dependent on the duty rate of the drive control signal. It is a feature of this invention that the duty rate of a first velocity is a function of the square of the second velocity to the first velocity. Using this relationship very precise acceleration control can be obtained over a d-c motor and particularly when the desired motor velocity is changing. A further element of the control system comprises means for terminating the application of drive control signals of the predetermined duty rate upon completion of the rotation of the d-c motor to the predetermined angle of rotation. It is a further feature of this invention that the frequency rate of the drive control signals supplied for motor drive is a submultiple of the frequency rate of the digital pulse source. The submultiple is a selectable one and would be determined by the frequency of resonance of the motor and/or its associated mechanical system.

The foregoing and other objects, features and advantages of the invention will be apparent from the following more particular description of a preferred embodiment of the invention, as illustrated in the accompanying drawing.

DESCRIPTION OF THE PREFERRED EMBODIMENT

Figure 1:
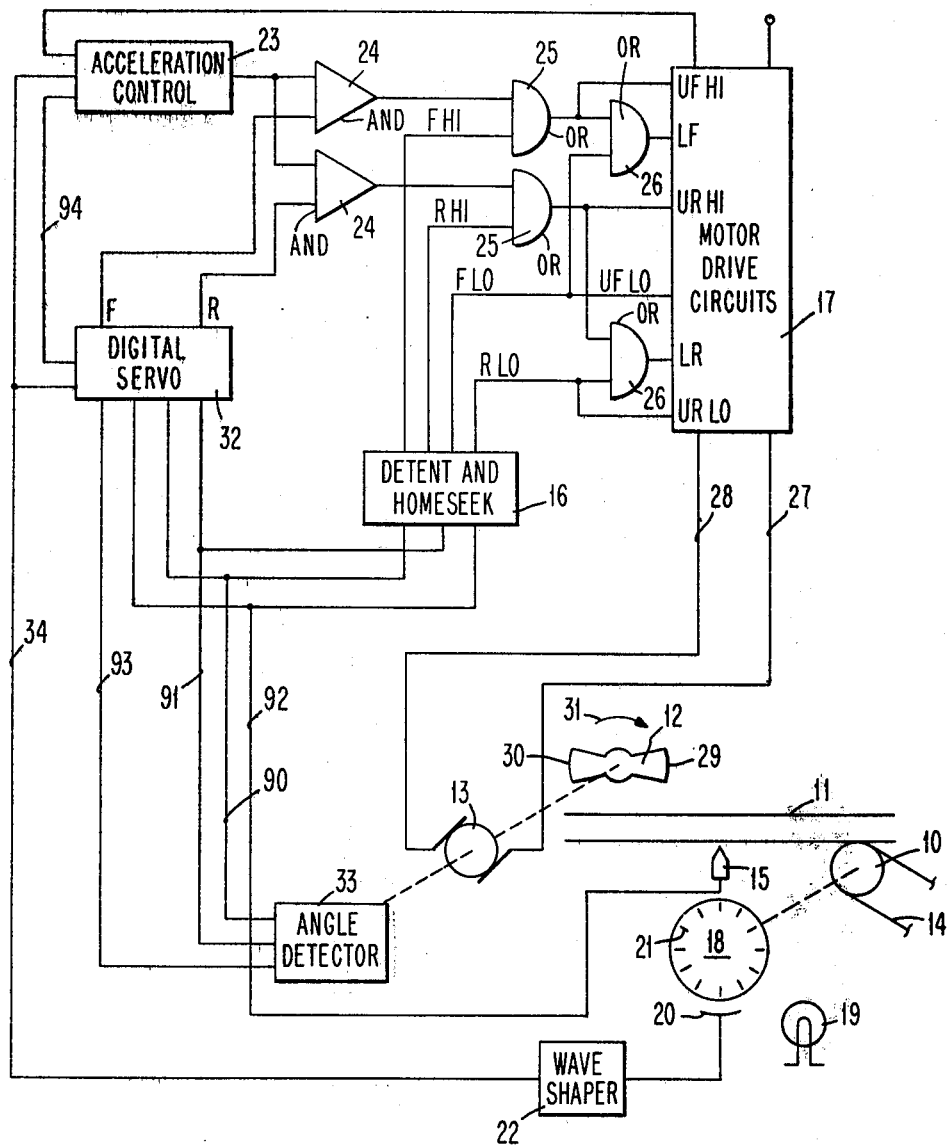
FIG. 1 is a schematic of a document handling machine utilizing the motor control system of this invention.
Figure 7:
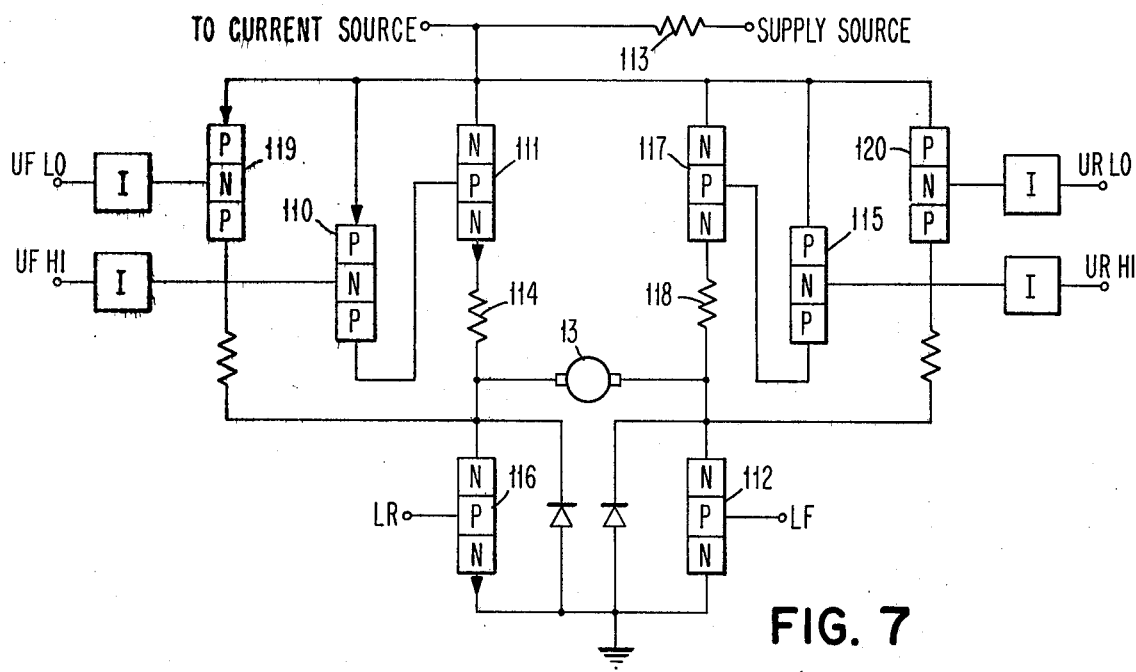
FIG. 7 is a circuit diagram of the motor drive circuit used with this invention.

Referring to FIG. 1, a d-c motor 13 is mechanically connected to a type sector 12 which is accelerated from a rest position to a predetermined velocity to endorse record documents such as checks (not shown) being fed seriatim toward the sector 12 along a document transport 11. The checks are fed along transport 11 by feed rolls including roll 10 driven by a belt drive system including belt 14. Check feeding devices including transports, belt drives, as well as endorsing mechanisms, are wellknown in the art and are illustrated herein in brief schematic merely to show one application of this invention. A timing disk 18 having transparent timing slots 21 is mechanically connected to rotate with the drive roll 10. A frequency analog signal representing the velocity of the checks and hence, the desired velocity of the drive motor 13 and type sector 12 is produced by rotation of the disk 18 so that radiation from light source 19 passing through slots 21 of moving disk 18 is sensed by a photocell 20 thereby generating a stream of digital pulses having a frequency directly proportional to the rate of rotation of drive roll 10 which in turn is proportional to the velocity of the documents to be endorsed. Of course, it is understood that when drive roll 10 is rotating at a constant speed, the frequency analog signal comprises a stream of electrical pulses occurring at a constant frequency rate. However, drive roll 10 rotates at a changing velocity and the pulse rate of the frequency analog signal changes accordingly. The frequency analog signals from the photocell 20 pass through a waveshaper circuit 22 and are then applied to an acceleration control circuit 23, which is part of the control means for d-c motor 13, which will be described in detail hereinafter. While the source of the frequency analog signal for acceleration control of drive motor 13 is illustrated as being a rotating disk with transparent slots for producing pulses in a photocell, other digital pulse sources tied to roll 10 for indicating desired velocity may be used. In accordance with this invention, the acceleration control circuit 23 converts the frequency analog signal to provide frequency and pulse width modulated drive signals which are applied through logic circuits comprising AND gates 24 and OR gates 25 and 26 to motor drive circuit 17 which has outputs 27 and 28 connected to the d-c motor 13 to regulate the acceleration of motor 13 to a desired velocity. In practicing this invention, the d-c motor 13 may take various forms but is preferably a permanent magnet d-c servo motor. Likewise, the motor drive circuits 17 may take various forms, however, a preferred form of drive circuit particularly useful for controlling d-c motors for driving type sector 12, is shown in detail in FIG. 7. As shown in FIGS. 1 and 7, the motor drive circuits 17 have input drive connections for both forward and reverse, high and low power acceleration. The inputs for upper and lower forward high power drive are UFHI and LFHI, respectively. The symbol URHI identifies the upper reverse high power input while LR identifies the lower reverse input for both high and low power. UFLO and URLO identify the upper forward and upper reverse low power connections, respectively.

The specific manner in which the motor drive circuits are energized to accelerate and decelerate motor 13 can best be seen by reference to FIG. 7. Acceleration, as previously stated, occurs when there is a combination of UFHI and LF signals. These signals respectively turn on transistors 110 and 112. Transistor 110 in turn turns on transistor 111 causing current to flow from the 60 volt supply through resistor 113, resistor 114, motor 13, and transistor 112 to ground. For deceleration URHI and LR signals are applied to respectively turn on transistors 115 and 116. Transistor 117 is turned on causing current from supply source through resistor 113 to transistor 117, resistor 118 through motor 13 in the reverse direction, and transistor 116 to ground. Likewise, a UFLO signal and an LF signal respectively turn on transistors 119 and 112 to operate motor in a first direction at low power. A URLO signal turns on transistor 120 in combination with an LR signal turning on transistor 116 to operate motor 13 in the reverse direction from their low power. For detenting purposes an LR and LF signal applied to transistors 116 and 112 respectively ground the terminals of motor 13 to hold it at a fixed position.

In the particular application illustrated in FIG. 1, the type sector 12 is rotated intermittently by motor 13 in a clockwise direction as shown by arrow 31 from a position of rest, i.e., the "home" position. In the particular embodiment shown, type sector 12 is provided with two type faces 29 and 30. In each cycle of operation the acceleration control 23, in accordance with this invention, applies a series of drive pulses to the UFHI and LF inputs of the motor drive circuits 17 as described to accelerate motor 13 so that the respective type faces 29 and 30 of type sector 12 move from the "home" position to a velocity which matches the linear velocity of the check moving on transport 11. When the type sector 12 has rotated to a predetermined angle and reached the desired velocity, the drive pulses applied by acceleration control 23 to the UFHI and LF inputs of drive circuit 17 are shut off allowing motor 13 to coast and to be driven along with the sector 12 by the document as it is fed through the endorsement station by the feed rolls. When the type sector 12 has rotated through the endorsement angle, drive pulses from acceleration control 23 are then applied to the URHI and LR inputs of motor circuit 17 as described to decelerate motor 13 until it comes to rest at the home position prior to the arrival of the next document to be endorsed by the alternate type face of segment 12. Both upon the termination of deceleration and when the machine is first started up, motor 13 is located at "home" position and retained there by operation of the detent and homeseek circuit 16 upon signal from the angle detector 33.

Figure 5:
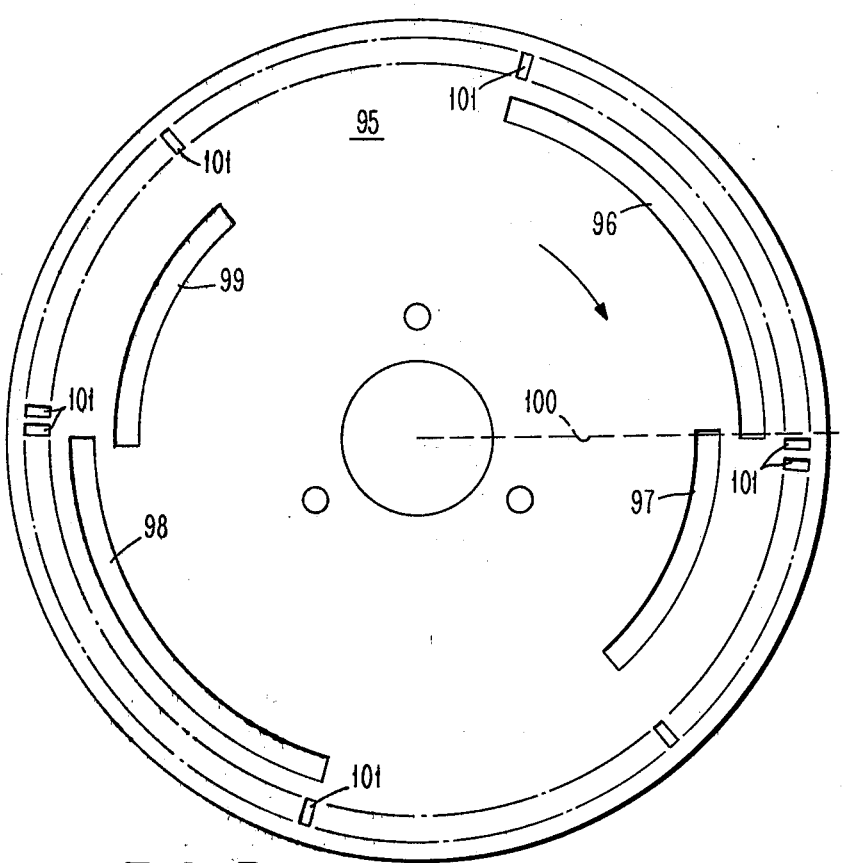
FIGS. 5 and 6 show details of the angle detector used with this invention.
Figure 6:
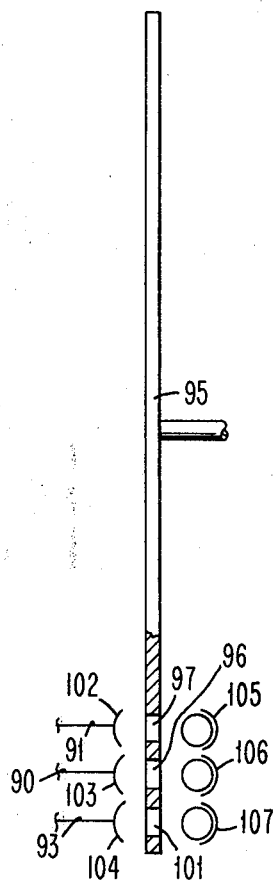

The means for determining the "home" position and the acceleration, coast, and deceleration phases of operation of motor 13 comprises an angle detector 33 operably connected to motor 13. In the preferred embodiment, as shown in FIGS. 5 and 6, the angle detector 33 comprises a circular disk 95 mounted to be rotated with motor 13 in a clockwise direction, as seen in FIG. 5. Disk 95 which is generally opaque is provided with a plurality of transparent arcs 96, 97 98, and 99. Transparent arcs 96 and 98 are acceleration arcs while the transparent arcs 97 and 99 are the deceleration arcs. The arcuate length of the acceleration arcs 96 and 98 correspond with the angular distance type sector 12 must rotate from "home" position to the point where the related type faces 29 and 30 make initial contact with a document on transport 11. The opaque sector of disk 95 between accelerate arc 96 and decelerate arc 99 has an angular length corresponding with the angular length of one of the type faces 29 and 30 of type sector 12. Similarly, the opaque sector of disk 95 between accelerate arc 98 and decelerate arc 97 has an arcuate length corresponding with the length of the second of the type faces of type sector 12. Arcs 96 and 97 have a small angular overlap (e.g. 1°–1.5°) to define a first "home" position for type sector 12, as indicated by broken line 100. Similarly, acceleration arc 98 and deceleration arc 99 have the same small angular overlap to define a second "home" position for type sector 12 when the overlap is located on line 100. Disk 95 is also provided with a plurality of transparent position notches 101 which are uniformly spaced around the entire periphery of the disk. The position notches 101 serve to indicate the position of the motor 13 at all times including the acceleration, deceleration and coasting phases of operation. Transducers for sensing the acceleration and deceleration arcs and the position notches are located along the "home" position line 100. As seen best in FIG. 6, the acceleration, deceleration and position transducers respectively comprise photosensitive elements 102, 103 and 104 located on one side of disk 95 while light emitting elements 105, 106 and 107 are located on the opposite side. Photosensitive elements 102 – 104 are respectively connected by leads 91, 90 and 93 to the digital servo 32 and the detent and homeseek circuit 16, as shown in FIG. 1.

As described, the overlap of the arcs 96 and 97 defines home position. The combination of signals from photosensors 102 and 103 on lines 90 and 91 define the "home" position, as well as the direction in the vicinity of that position for the operation of the detent and homeseek circuit 16. A single output signal on line 90 defines the acceleration phase to digital servo 32 and produces a gate 1 signal on the F output to the corresponding AND gate 24 to gate drive pulses from acceleration control 23 to UFHI AND LF. A single input on line 91 from photosensor 102 defines the deceleration phase of the machine cycle and causes the digital servo 32 to produce a gate signal at the R output to a related AND gate 24 for connecting drive pulses from the acceleration control 23 to the URHI and LR inputs of the drive circuits 17. The absence of signals on lines 90 and 91 indicate the coast phase of motor 13 and causes the digital servo 32 to remove the F signal from the AND gate 24 and UFHI - LF inputs of motor drive circuits 17. Position signals from the photosensor 104 of angle detector 33 on line 93 is used by a digital servo 32 to gate acceleration or deceleration pulses in accordance with desired motor operating characteristics.

For the initiation of the acceleration phase, as previously described, a document sense signal from sensor 15 on line 92 is applied simultaneously to the detent and homeseek circuit 16 and digital servo 32. If the motor 13 is in the "home" position as indicated above, the FHI and RHI outputs of the detent and homeseek circuit 16 are down thereby releasing the power from drive circuit 17. With the outputs on lines 90, 91 and 93 digital servo 32 is activated to apply a gate signal on its F output to the corresponding AND gates 24 and OR gates 25 and 26, thus, conditioning these logic circuits to permit the application of drive pulses from acceleration control 23 to UFHI and LF inputs of drive circuits 17. Thus, the acceleration phase is initiated to permit pulses from waveshaper 22, the digital servo 32 and acceleration control 23 to apply drive pulses to the drive circuit 17.

Figure 8:
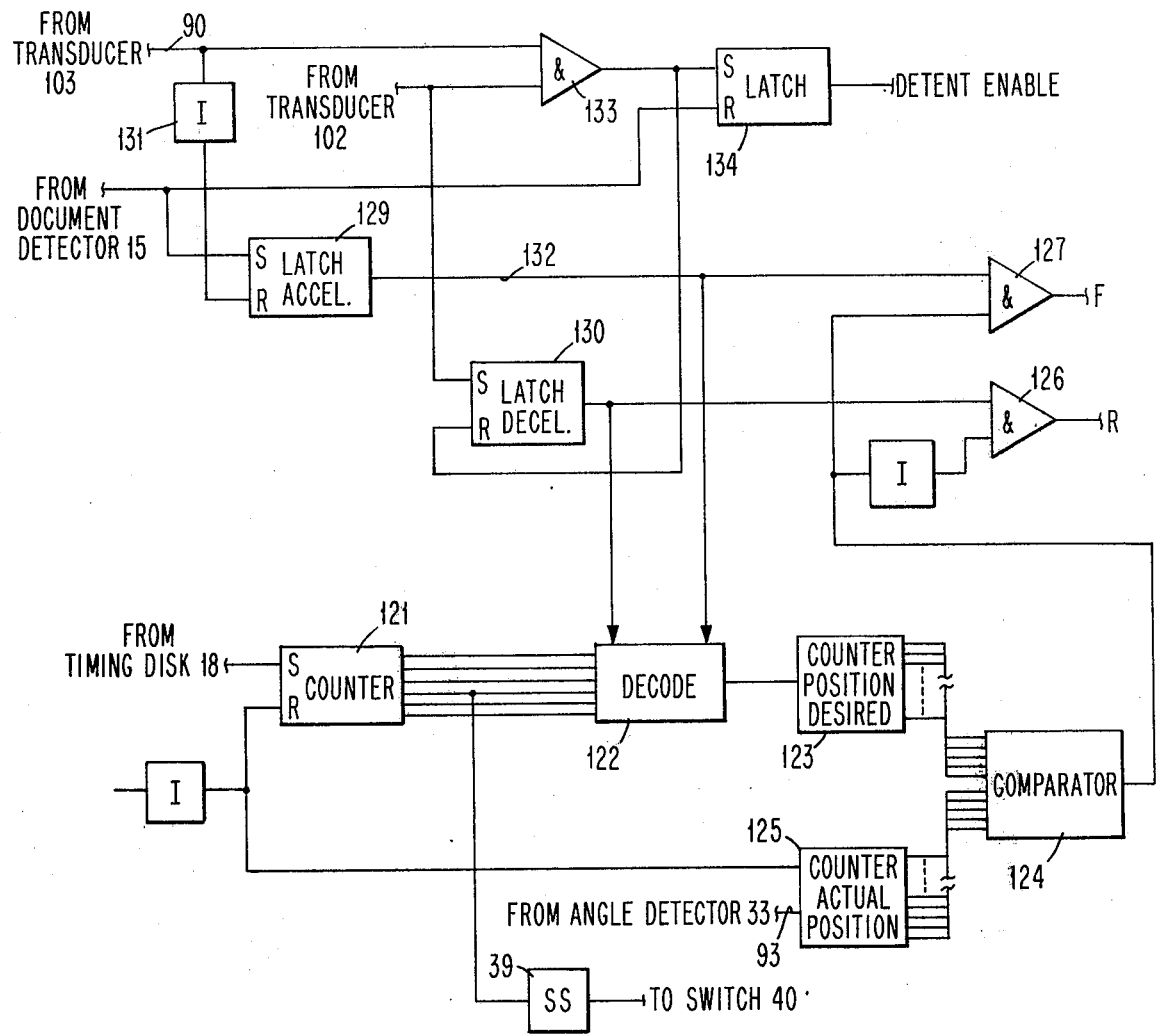
FIG. 8 is a circuit diagram showing details of the digital servo and detent elements of FIG. 1.

While the digital servo 32 can take various forms, in the preferred form it also is a displacement servo which monitors the displacement of motor 13 (and sector 12) to periodically determine its location during the acceleration and deceleration phases relative to the desired location. As seen in FIG. 8, the digital servo circuit 32 comprises a first counter 121 which receives timing pulses from the timing disk 18 connected to the feed rolls of the document transport. Counter 121 is a multistage digital counter having outputs from each stage connected to a decode circuit 122. The decode circuit 122 converts the count of counter 121 and supplies an output to a counter 123 whose output is connected to a comparator 124. The count from counter 123 represents the desired position of motor 13 during the acceleration and deceleration phases. Also provided by the digital servo circuit is a counter 125 which has an input connected to the photosensor 104 which reads the position notches 101 on disk 95. Counter 125 has a count output connected to a second input of comparator 124. The output from counter 125 represents the actual position of motor 13 during the acceleration, coast, and deceleration phases. The comparator circuit 124 functions to compare the desired position of motor 13 with the actual position during the course of the acceleration and deceleration phases. If the actual position of motor 13 as represented by the count of counter 125 is equal to or less than the desired position as represented by the count of counter 123, an output signal from comparator 124 is applied to AND gates 126 and 127 which are connected to the F and R outputs of digital servo 32 to AND gates 24 (see FIG. 1) for gating acceleration or deceleration pulses to the motor drive circuits 17, as previously described. Further details of operation of the digital servo circuit 32 can be understood by reference to the previously mentioned publication in the IBM Technical Disclosure Bulletin.

In accordance with this invention the digital servo circuit 32 is further provided with phase latches 129 and 130. Latch 129 has its set input connected through line 92 (see FIG. 1) to document detector 15. The reset input of latch 129 is connected through inverter 131 and lead 90, transducer 103 of disk 95 of the angle detector 33. Thus, when a document is sensed by detector 15 after an accelerate signal from transducer 103 to inverter 131 which has reset latch 129, latch 129 is set to supply an output on line 132 which conditions decode 122 to operate in the accelerate mode and applies a signal to AND gate 127 in preparation for a gating signal from comparator 124 to produce an F output to AND gate 24 to initiate the acceleration of motor 13. Latch 130 has its set input connected through line 91 to transducer 102 which senses the deceleration arcs 97 and 99 of disk 95 of the angle detector 33. The reset input of deceleration latch 130 is connected to the output from AND gate 133. As previously described, when the motor 13 is in the "home" position, transducers 102 and 103 will generate signals on lines 90 and 91 to AND gate 133 to produce an output to reset latch 130. During the deceleration phase the output from transducer 102 on line 91 sets decelerate latch 130 which applies an output signal to convert decode circuit 122 to the decelerate phase and to gate a signal from comparator 124 to AND circuit 126 to produce an output signal on the R output of digital servo 32 (see FIG. 1) for gating decelerate drive pulses through AND gate 24 to the URHI and LR terminals of the motor drive circuit 17. At the end of the deceleration phase when the disk 95 indicates that motor 13 is in the "home" position, a pulse from AND gate 133 resets decelerate latch 130 and removes the output from AND gate 126. The output from AND gate 133 also sets a detent latch 134 which produces an output signal DETENT ENABLE which is applied to the detent and homeseek circuitry 16 which holds the motor 13 in the "home" position until released by a reset signal from document detector 15 at the beginning of the acceleration phase of operation. The details of operation of the detent homeseek circuit 16 may be more fully understood by reference to the U.S. Pat. No. 3,541,418 of G. J. Agin et al, issued on Nov. 17, 1970.

Figure 2:
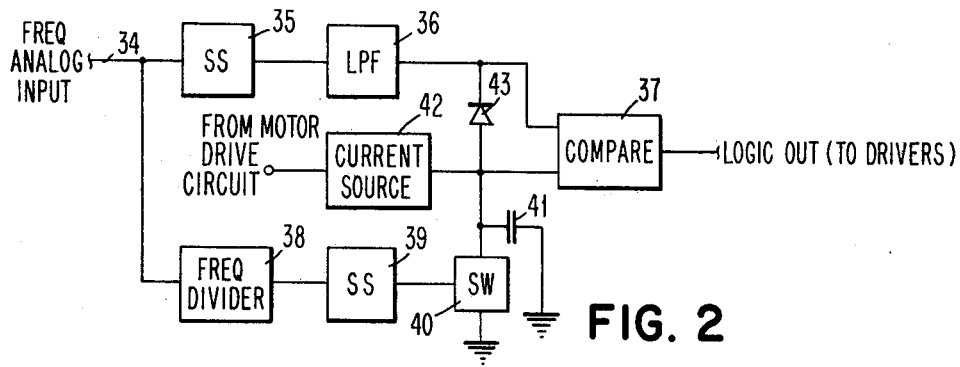
FIG. 2 is a logic circuit diagram of the acceleration control portion of the motor control system of FIG. 1.

As previously indicated, this invention comprises acceleration control circuit means which converts the frequency analog signal to a pair of analog control signals. A logic diagram shown in FIG. 2 illustrates the organization of such conversion circuit. The frequency analog signal on line 34 is applied to single shot 35 to a low pass filter 36 connected to one input of a voltage comparison circuit 37. The frequency analog signal on line 34 is also applied to a frequency divider circuit 38 (in this case counter 121 in digital servo 32) where the frequency rate is reduced to a level determined by the resonant frequency of the motor drive system and the electrical time constant of the motor. This reduced frequency analog control signal is applied to single shot 39, which is used to drive a high speed switch 40, which is connected to a second input of voltage comparison circuit 37. Basically, the single shot 35 changes the digital pulse of the frequency analog signal to rectangular control pulses of substantially uniform width. These control pulses are then converted by the low-pass filter 36 to a direct voltage signal whose magnitude is dependent on the frequency rate of the control pulses. Single short 39 also changes the submultiple digital pulses from a frequency divider 38 to the rectangular control pulses of substantially uniform width. These pulses are then used to operate high-speed switch 40, which applies a pulsating voltage signal to the second input of voltage comparison circuit 37. As previously stated, the preferred form of the pulsating analog control signal is a sawtooth signal. The means for generating this signal is a sawtooth generator which includes capacitor 41, which is regulated to receive charge from current source 42 by the high-speed switch 40, operated by the single shot 39. Thus, the frequency rate of the sawtooth generator is controlled by the frequency rate of the digital signal from single shot 39. The voltage level of the sawtooth pulse, however, is determined by the current source 42 and the capacitor 41. A diode 43 is connected across a current source to the output of low pass filter.

Figure 4A:
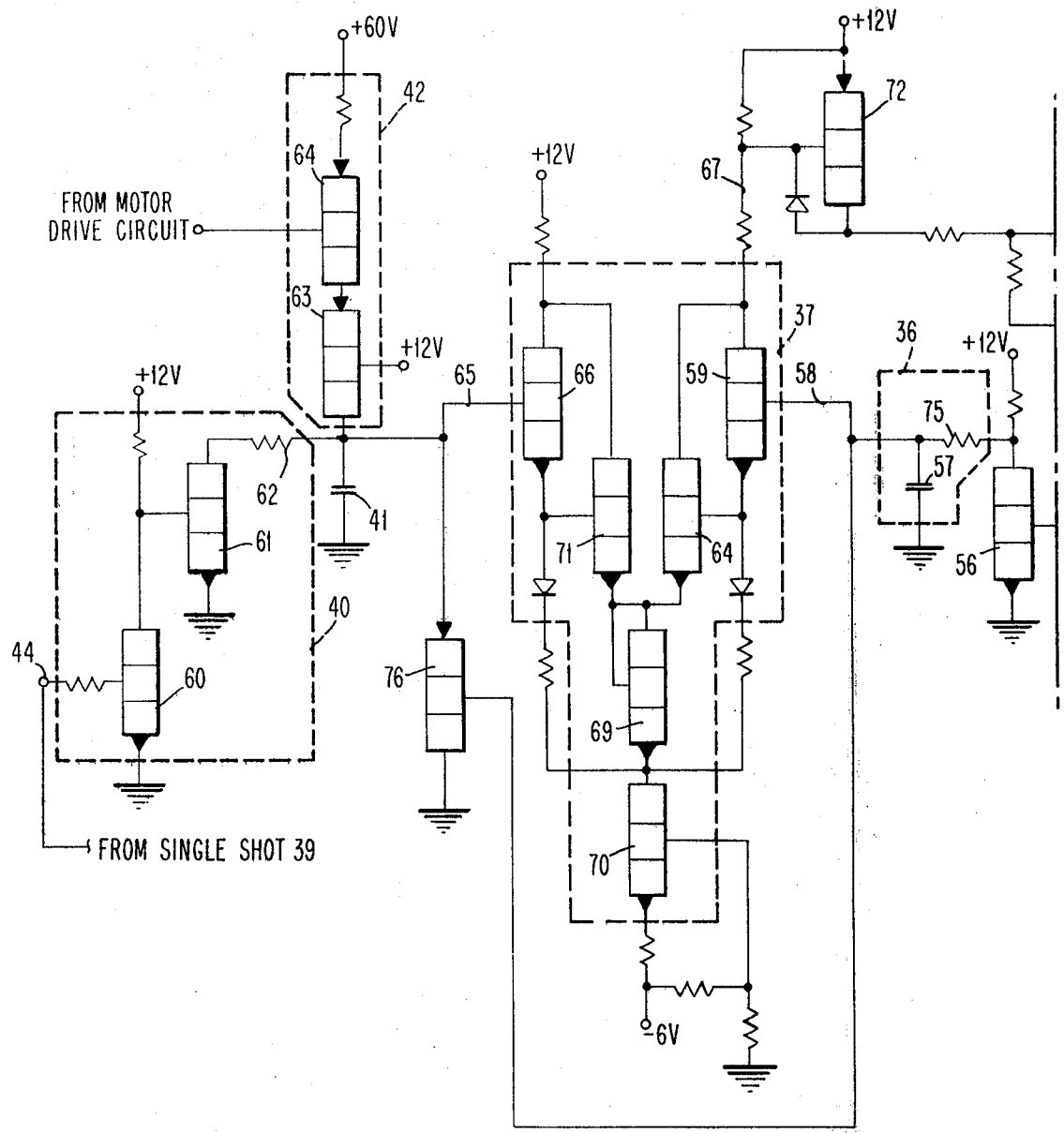
FIGS. 4a and 4b show circuit details of the acceleration control portion of the motor control system of FIG. 2.
Figure 4B:
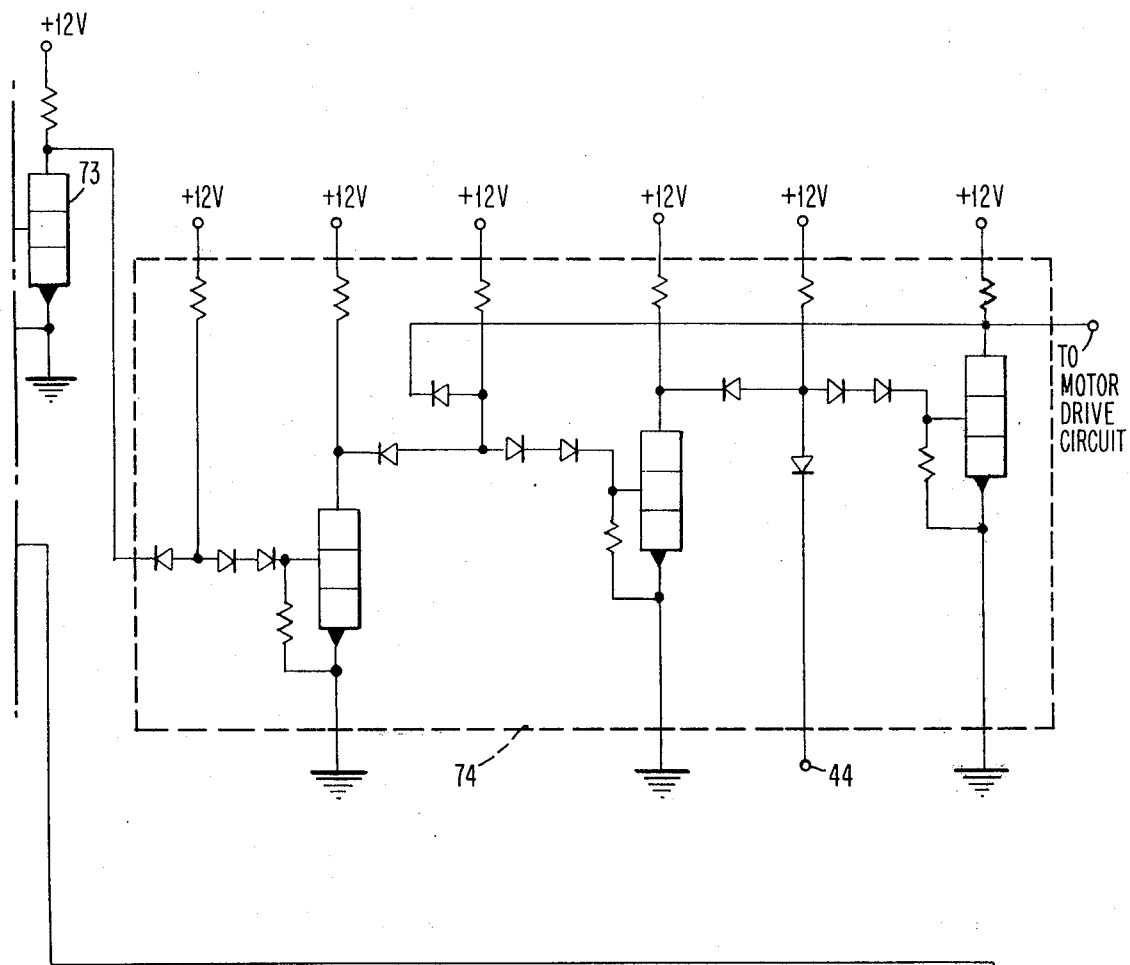
Figure 4B:
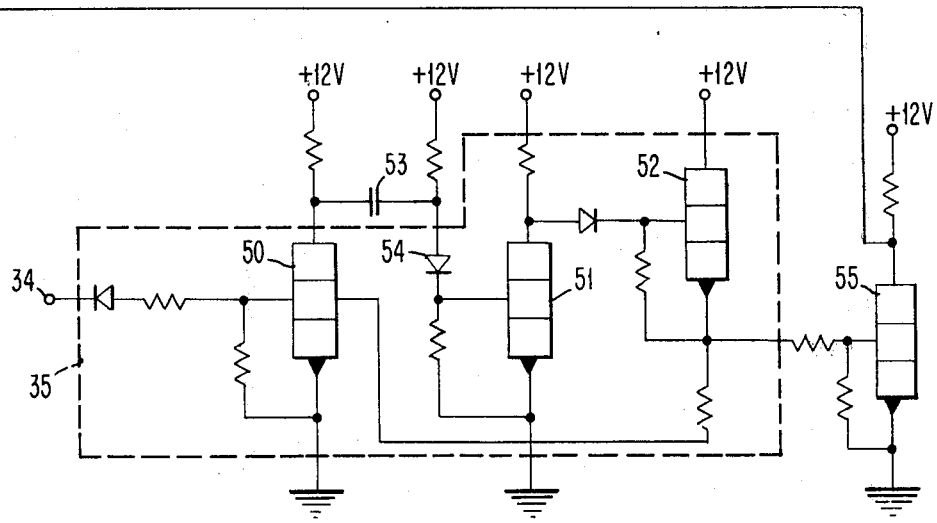

The further details of the acceleration control circuitry 23 is seen in FIGS. 4a and 4b. In FIG. 4b, transistors 50, 51 and 52 are connected to form a single shot 35 having an input connected to line 34 for connection to the digital pulse source which generates the frequency analog velocity indicating signals. Capacitor 53 connected across voltage sources to the collector of transistor 50 and through diode 54 to a base of transistor 51 to determine the astable time of the single shot 35. The output from single shot 35 is connected to transistor 55, which inverts the single shot signal and applies it to the base of transistor 56, which coacts with capacitor 57 and resistor 75 which form low-pass filter 36. The output from the low-pass filter 36 is applied on line 58 to the base of transistor 59 of voltage comparison circuit 37.

The second means for converting the frequency analog signal from the digital pulse generator, as shown in FIG. 2, comprises a frequency divider 38 connected to a single shot 39. The details of the circuit for frequency divider 38 are omitted since such circuitry is well-known in the art. Likewise, the details of single shot 39 are not shown since they are substantially identical to the single shot circuitry for single shot 35, as shown in FIG. 4b. The output from single shot 39 generates a RESET signal on line 44, which is connected to the base of transistor 60, which with transistor 61 forms high-speed electronic switch 40. The collector of transistor 61 is connected through resistor 62 to capacitor 41 and to current source 42 comprising transistors 63 and 64. The high-speed switch 40, capacitor 41, current source 42 coact to generate a sawtooth wave having a frequency rate equal to the frequency of the control signal generated by single shot 39. The sawtooth wave is applied on lead 65 to the base of transistor 66 of voltage comparison circuit 37. The slope of the ramp of the sawtooth signal is regulated in accordance with the current in d-c motor 13. For this purpose a current sensing element such as resistor 113, FIG. 7, in the motor circuitry is connected to the base of transistor 64 in current source circuit 42.

As previously stated, the voltage comparison circuit 37 functions to compare the direct voltage from the low-pass filter 36 on line 58 with the voltage of the sawtooth wave on line 65. When the voltage of the sawtooth wave reaches the level of the direct voltage analog signal on line 58, comparison circuit 37 generates a signal on output 67 for operating the d-c motor 13. In the preferred embodiment of this invention, the capacitor 41 and current source circuit 42 are selected so that a voltage level for the sawtooth wave is at least equal to and preferably slightly greater than the maximum direct voltage from low-pass filter 36. Transistor 76 is connected across input lines 65 and 58 to voltage comparison circuit 37 to clamp the sawtooth signal to the same voltage level as the direct voltage from low-pass filter 36.

Essentially, transistor 76 performs the function of diode 43 shown in FIG. 2. Basically, voltage comparison circuit 37 is a high gain differential amplifier in which transistors 59 and 64 and transistors 66 and 71 are connected as Darlington pairs in combination with current source 70. The output 67 from the voltage comparison circuit 37 is connected to the base of transistor 72, which has its collector connected to the base of the second transistor 73. Transistors 72 and 73 are connected for amplifying the motor drive control signals. In the preferred embodiment the output from transistor 73 is connected to an inverter-latch 74 whose output 75 is connected to the motor drive circuit.

Figure 3A:
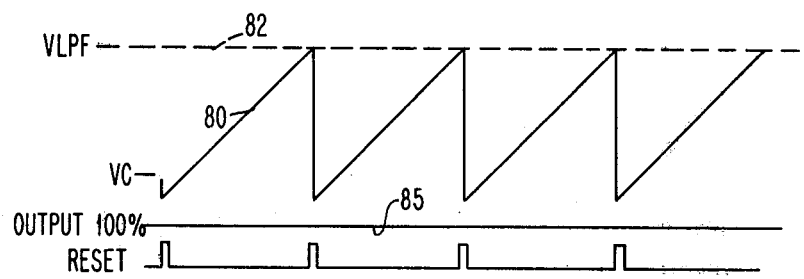
FIGS. 3a – 3c are waveforms illustrating various operation levels of the motor control system of FIG. 2.
Figure 3B:
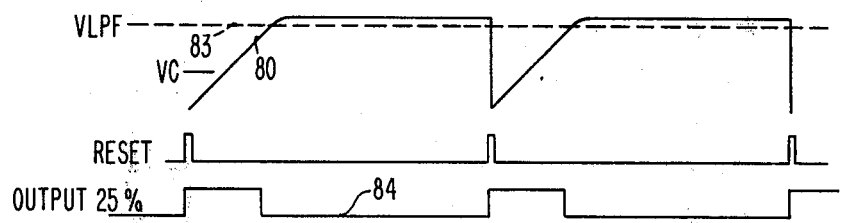
Figure 3C:
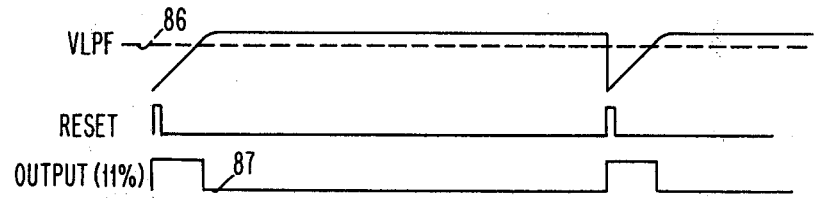

The operation of the d-c motor control of this invention can be best understood by reference to FIGS. 2, 4a and 4b, along with reference to the waveform shown in FIGS. 3a, 3b and 3c. As the digital pulses are generated from disk 18, light source 19 and photocell 20 to produce a frequency analog signal applied to the acceleration control circuit on line 34, a square-wave signal from single shot 35 is converted by low-pass filter 36 to a direct voltage whose level is dependent on the frequency rate of the frequency analog signal. Low-pass filter 36 has a bandpass much lower than the repetition rate of single shot 35. Therefore, the output of low-pass filter 36 represents the average value of the input. Since single shot 35 provides uniform width, constant amplitude pulses; the output is dependent on frequency. At the same time capacitor 41, high-speed switch 40 and current source 42 operate to generate the sawtooth wave 80, which is applied to second input 65 of voltage comparison circuit 37. As previously indicated, the frequency rate of signal 80 is proportional to the frequency of the reset signal 81 coming from single shot 39. As seen in FIG. 3a, if the voltage level of the direct voltage signal on input 58 is equal to or greater than the peak voltage of sawtooth wave 80, the duty cycle of the output voltage on line 67 from voltage comparison circuit 37 is also a direct voltage. In other words, the voltage comparison circuit which is normally on does not get turned off by the sawtooth wave and has a 100 percent duty cycle. As seen in FIGS. 3b and 3c, however, when the direct voltage from low-pass filter 36, as shown by broken line 83, is less than the peak voltage of sawtooth 80, diode 43 clamps the voltage applied to line 65 when the sawtooth ramp reaches the level of the voltage from low-pass filter 36. So long as the sawtooth wave has a voltage level less than the level of the voltage from low-pass filter 36, an output voltage appears on lead 67 from comparison circuit 37. When the ramp voltage of the sawtooth wave 80 reaches the level of the voltage from low-pass filter 36, the output on line 67 is turned off and remains off until the next cycle of sawtooth generator, namely, the arrival of reset pulse from single shot 39, which discharges capacitor 41.

In accordance with a feature of this invention, the duty cycle of the output signal from comparison circuit 37 for two different desired velocities is proportional to the square of the ratio of these velocities. This is illustrated in FIG. 3b where output signal 84 has a duty cycle which is 25 percent or ¼ of the output signal 85 in FIG. 3a, where the direct voltage of curve 82 is twice the level of voltage of curve 83. FIG. 3c shows the condition for velocity which is one third (⅓) the velocity of FIG. 3a. In FIG. 3c the direct voltage line 86 which represents the direct voltage from low-pass filter 36 is one third the direct voltage (line 82) of FIG. 3a. Consequently, the duty rate of output signal 87 (FIG. 3c) is one ninth (1/9) the duty rate of output signal 85 (FIG. 3a). By charging duty rate in accordance with this relationship, drive pulses applied to motor 13 by drive circuit 17 accelerate the motor more precisely to the desired velocity at the desired angle of rotation.

While in the particular example illustrated the operation of the invention involves acceleration of d-c motor 13. The principles of the invention would apply for deceleration. Also while motor 13 preferably is accelerated from a rest condition for the specific application, it could also be accelerated or decelerated in accordance with this invention from a dynamic state.

While the invention has been particularly shown and described with reference to a preferred embodiment thereof, it will be understood by those skilled in the art that various changes in form and details may be made therein without departing from the spirit and scope of the invention.

We claim:

1. A motor control system comprising in combination a rotatable d-c motor, and
   drive control means for said motor including means for selectively accelerating said motor to various desired velocities within a predetermined angle of rotation of said motor including,
   an external source of digital pulses for generating a frequency analog signal representing desired motor velocity,
   and acceleration control means for supplying to said motor drive control signals having a duty rate which varies in accordance with the square of said desired motor velocity comprising
   means for converting said frequency analog signal to first and second control signals,
   said first control signal being a direct voltage signal representing a desired motor velocity,
   said first control signal having a voltage level dependent on the frequency of said digital pulses,
   said second control signal being a periodic signal having a frequency representing said desired motor velocity,
   said second control signal having a predetermined peak voltage level equal to at least the voltage level of the maximum desired velocity and a frequency dependent on said frequency analog signal,
   and means for generating said drive control signals at said duty rate in accordance with the comparative voltage levels of said first and second control signals.

2. A motor control system in accordance with claim 1 in which
   said means for converting said frequency analog signal to said first control signal comprises
   a first conversion circuit including
   first means for changing said digital pulses from said external source to rectangular control pulses of substantially uniform width, and
   means for converting said rectangular control pulses to said direct voltage signal,
   said direct voltage signal having a voltage level dependent on the frequency rate of said rectangular control pulses, and said means for converting said frequency analog signal to said second control signal further comprises
   second means for changing said digital pulses from said external source to rectangular control pulses of substantially uniform width, and
   means for converting said rectangular control pulses of said second means to a sawtooth periodic control signal,
   said sawtooth signal having a predetermined maximum peak voltage and having a frequency rate proportional to the frequency rate of said rectangular control pulses of said second means, and
   said means for generating said drive control signals includes a comparison circuit means operable for generating a drive control signal having a duty rate dependent on said voltage level of said direct voltage compared with the voltage level of said sawtooth periodic control signal.

3. A motor control system in accordance with claim 2 in which.
   said first means of said first conversion circuit for converting said digital pulses to rectangular control pulses comprises a first signal shot, and
   said means for converting said rectangular control pulses from said first single shot to a direct voltage control signal comprises a low-pass filter,
   said low-pass filter being connected to a first input of said comparison circuit means.

4. A motor control system in accordance with claim 3 in which
   said second means of said second conversion circuit for converting said digital pulses to said rectangular control pulses comprises a second single shot, and
   said means for generating said sawtooth control signal comprises a capacitor circuit and switch means therefor operable in the control of said second single shot,
   said capacitor being connected to a second input of said comparison circuit means.

5. A motor control system in accordance with claim 4 in which
   said means for providing said drive control signal to said motor further comprises
   means connected to said first and second inputs of said comparison circuit means for clamping the voltage level of said low-pass filter to said capacitor.

6. A motor control system in accordance with claim 1 in which
   said periodic control signal converted from said digital pulses has a frequency rate which is a submultiple of the frequency rate of said digital pulses.

7. A motor control system in accordance with claim 2 in which
   said second conversion circuit means includes a frequency divider for converting the digital pulses to said periodic control signal at said frequency rate which is proportional to said submultiple of said frequency rate of said digital pulses.

8. A motor control system in accordance with claim 1 in which said acceleration control means further comprises means for determining the angle of rotation of said motor, and means responsive to said angle determining means for terminating the application of said motor drive control signals from said acceleration control means.

9. A motor control system in accordance with claim 8 in which said angle determining means comprises decode means operably connected for rotation with said d-c motor for generating a termination signal to said acceleration control means upon completion of rotation of said d-C motor through said predetermined angle.

* * * * *